Dec. 19, 1967 W. C. GARNER 3,358,661
INTERNAL COMBUSTION ENGINE BY-PRODUCTS EMISSION CONTROL MEANS
Filed Oct. 14, 1965
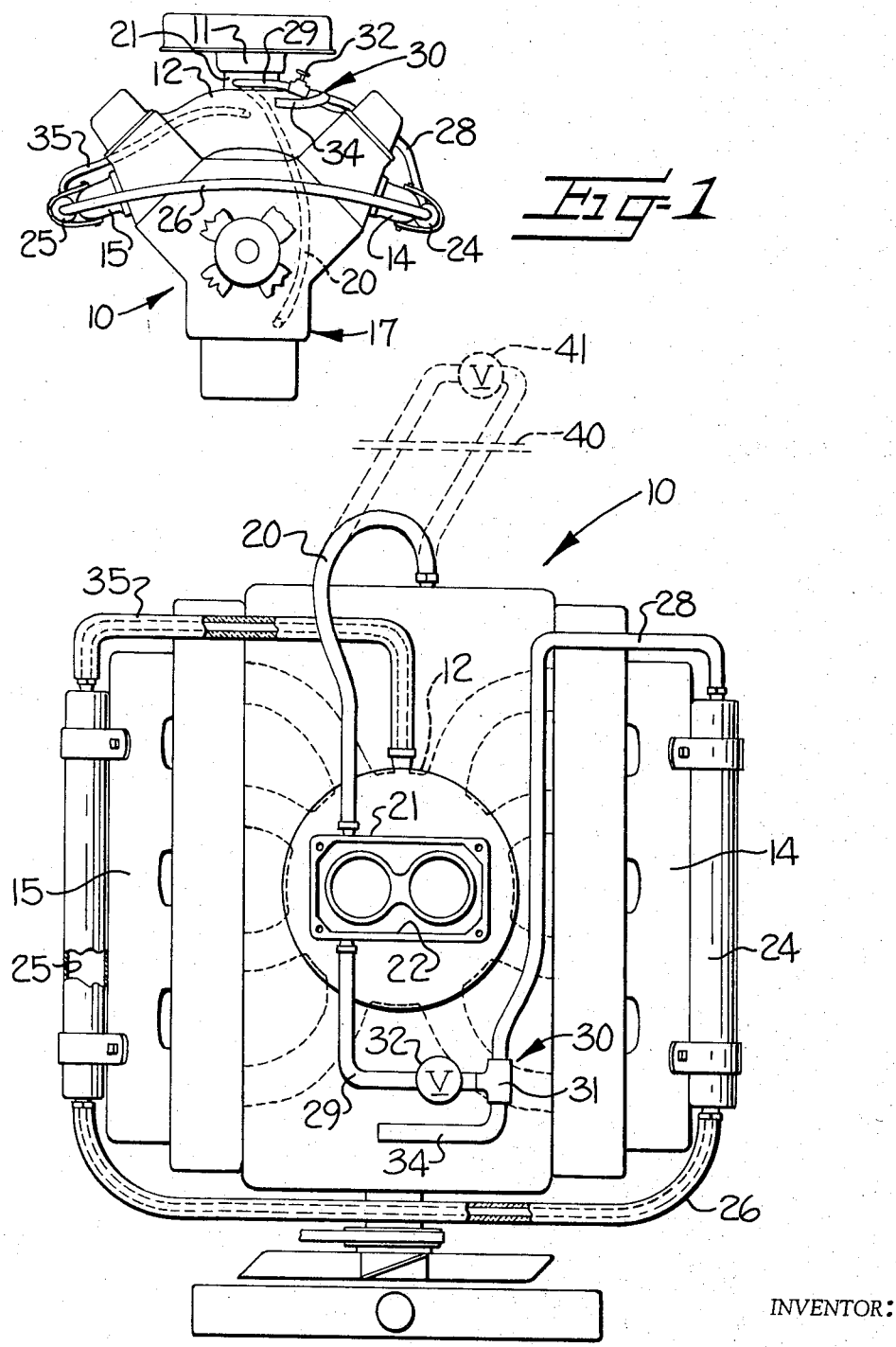
INVENTOR:
WILLIAM C. GARNER
BY Parrott, Bell, Seltzer, Park & Heard
ATTORNEYS

3,358,661
INTERNAL COMBUSTION ENGINE BY-PRODUCTS EMISSION CONTROL MEANS
William C. Garner, Rte. 2, Vass, N.C. 28394
Filed Oct. 14, 1965, Ser. No. 495,972
7 Claims. (Cl. 123—119)

My invention relates to by-products emission control means for an internal combustion engine and, more particularly, to a means for use in combination with a conventional internal combustion engine for reducing the emission of smog causing engine by-products, such as blow-by gases.

The generation of smog in the atmosphere is known to produce many and varied deleterious results, and much attention has recently been directed to attempts to control at least some of the factors contributing to the generation of smog. Particular attention has been directed to the emission of by-products of combustion from conventional internal combustion engines, such as used in automobiles, inasmuch as such by-products have been determined to be a major contributing factor to smog generation. One proposed means for the reduction of the emission of smog generating by-products which has become widely known, and which is now required by law in some jurisdictions, is known as positive crankcase ventilation. In positive crankcase ventilation systems, as presently known and used, a flow of air is induced through the crankcase portion of an internal combustion engine and to the intake manifold to sweep from the crankcase and into the combustion chambers of the engine those by-products of combustion which enter the crankcase by leakage past the pistons or piston rings, and are known as blow-by gases.

Such positive crankcase ventilation systems suffer from a major deficiency in that when the blow-by gases from the crankcase are returned directly to the intake of the internal combustion engine, for recombustion in the combustion chambers, the smog generating factors are not entirely removed but substantial portions thereof are passed through the engine and exhausted to the atmosphere. Thus, the emission of the smog generating by-products is not eliminated, and the smog generating factors present in the by-product gases are not effectively controlled.

I have discovered that the smog generating factors present in such by-product gases may be reduced or effectively eliminated by subjecting the by-prouct gases to prolonged and severe heating prior to return of the gases to the intake of the internal combustion engine whereby at least some of the impurities in such gases are burned or changed in character before the gases reach the combustion chamber. Additionally, other advantages and benefits are derived from so treating the by-product gases prior to re-admission of the gases into the combustion chambers of the engine. Among these advantages and benefits is an improvement in the efficiency of fuel use, reflected in an increase in miles per gallon obtained in an automotive vehicle.

Accordingly, it is the object of the present invention to provide a means, in combination with an internal combustion engine, for heating by-product gases to reduce and effectively remove therefrom smog causing factors, thereby reducing the emission of smog causing by-products of combustion from the internal combustion engine.

Some of the objects and advantages of the invention having been stated, others will appear as the description proceeds when taken in connection with the accompanying drawings, in which:

FIGURE 1 is a front elevation view of an automotive internal combustion engine incorporating the means of the present invention; and FIGURE 2 is a plan view of the engine of FIGURE 1.

Referring now more particularly to the drawing, the means of the present invention is intended for use in combination with a substantially conventional internal combustion engine of the automotive type, indicated generally at 10. As is well known, such an internal combustion engine may be of a V-type (as here illustrated) or of a straight type, depending upon the particular cylinder arrangement chosen by an engine designer. In any event, such an engine 10 conventionally includes a carburetor 11 and an intake manifold 12, which together define a mixture passage for the flow of combustible mixture to the combustion chambers within the cylinders of the engine 10. The combustible mixture is formed by admitting, through the carburetor 11, a suitable fuel, such as gasoline, to be mixed with atmospheric air flowing through the mixture passage and into the combustion chambers of the associated engine. Additionally, such an engine includes an exhaust system for the flow of hot combustion products from the engine, such a system for a V-type engine having suitable first and second exhaust manifolds 14, 15 (respectively). The conventional internal combustion engine of the automotive type has, in a lower portion of the engine casing, a space in which the crankshaft of the engine revolves and which is known as a crankcase, as indicated generally at 17.

In order to avoid the deficiencies of the conventional positive crankcase ventilation system, the system of the present invention provides means for withdrawing by-product gases from the crankcase 17 of the engine 10, diluting the gases with fresh air if desired, and subjecting the same to prolonged and severe heating prior to their introduction into the mixture passage for flow with the combustible mixture, provided by the carburetor 11, into the engine. More particularly, a suitable conduit 20 is connected at one end to the crankcase 17 of the engine 10 to be in operative communication with the interior of the crankcase and receive therefrom by-product or blow-by gases including smog generating factors. A first heat exchanger means 21, in the form of a base plate secured to the intake manifold 12 and to which the carburetor 11 may be secured, is connected to the conduit 20 for receiving gases therefrom. The base plate 21 is positioned adjacent the mixture passage, intermediate the carburetor 11 and the intake manifold 12, and includes a hollow interior passage 22 through which the gases flowing from the crankcase 17 may pass in heat exhanging relation with the combustible mixture flowing from the carburetor 11 into the combustion chambers of the engine 10.

In order to eliminate undesirable smog causing factors from the blow-by gases flowing from the crankcase 17 and through the first heat exchanger means, or carburetor base plate 21, my invention provides means for thereafter heating the blow-by gases. More particularly, a second heat exchanger means is provided which is connected to the first heat exchanger means for receiving the by-product gases therefrom. The second heat exchanger means is positioned adjacent the exhaust system for passing the gases in heat exchanging relation with the hot combustion products leaving the internal combustion engine.

Preferably, the second heat exchanger means comprises a first heating chamber 24 and a second heating chamber 25, with each heating chamber being mounted directly on an associated exhaust manifold 14, 15 (respectively). The heating chambers may be attached to the respective exhaust manifolds by any suitable means, such as bolted brackets, and preferably are formed of a high thermal conductivity material such as copper. The first heating chamber 24 and second heating chamber 25 are connected for series flow of by-product gases therethrough, by a suitable conduit 26. The first heating chamber 24 is connected to the first heat exchanger means by suitable conduits 28, 29 to receive gases therefrom and pass those gases in heat exchanging relation with the hot combustion products within the exhaust manifold 14. The gases then flow through the conduit 26 connecting the first and second heating chambers 24, 25 and pass in heat exchanging relation with the hot combustion products gases in the second exhaust manifold 15.

Interposed between the first and second heat exchanger means, and between the conduits 28, 29, is a dilution means, indicated generally at 30, for mixing with the gases flowing from the crankcase 17 a flow of atmospheric air. More particularly, a dilution mixing chamber 31 is provided through which the gases from the conduit 29 pass, under the control of a suitable valve means 32 positioned in the conduit 29. An atmospheric air conduit 34 is provided which is open at one end to ambient atmosphere and connected at the opposite end to the dilution mixing chamber 31, to provide a flow of air into that chamber. The relative percentages of air flow and by-product gases flow may be determined by the setting of the valve 32. The mixing of a flow of ambient air with the by-product gases, or the dilution of the same in the dilution mixing chamber 31, has been found to be beneficial in obtaining reduction of smog causing factors in the by-product gases.

Subsequent to the passage through the first and second heat exchange means, by-product gases are conveyed through a suitable conduit 35 to a mixing chamber interposed in the combustible mixture passage. The mixing chamber means may be a volume within the intake manifold 12, or may be provided by an insert member positioned between the carburetor base plate 21 and the intake manifold 12. In any event, the by-product gases are at this point mixed with the combustible mixture, and flow with that mixture to the combustion chambers of the engine 10.

Where considered desirable to provide for control by a motor vehicle operator of the passage of by-product gases from the crankcase 17 to the intake manifold 12, the means of my invention may be modified as will be now described. More particularly, the conduit 20, connecting the crankcase 17 and the first heat exchanger means 21, may be extended into the cab or body of the motor vehicle, as by passing through the fire wall 40 (phantom lines in FIGURE 2) of the vehicle body. Within the passenger compartment of the vehicle body, a suitable valve 41 may be interposed in the conduit 20, and positioned to be operated by the vehicle operator. By closing the valve 41, a vehicle operator may seal the crankcase 17 against the removal of by-product gases therefrom and passage of those gases into the intake manifold 12.

In brief summary, the present invention relates to a means for reducing the emission of smog causing factors from a conventional internal combustion engine of the automotive type. More particularly, it has been discovered that smog causing factors contained in by-product gases removed from the crankcase of such an engine may be eliminated by heating the by-product gases prior to their return to the intake manifold of the engine. Means for heating the by-product gases are particularly provided in the form of a series arrangement of heat exchanger means, receiving gases from the crankcase of an associated engine and heating the same by passage in heat exchanging relation with exhaust combustion products of the engine prior to delivery to the intake manifold of the engine for recombustion.

In the drawings and specification there have been set forth preferred embodiments of the invention and, although specific terms are employed, they are used in a generic and descriptive sense only and not for purposes of limitation, the scope of the invention being defined in the claims.

I claim:
1. In an internal combustion engine including a carburetor and intake manifold together defining a mixture passage for the flow of combustible mixture to the engine, an exhaust system for the flow of hot combustion products from the engine, and a crankcase, the combination therewith of means for reducing the emission of smog causing by-products from the engine comprising:
   first heat exchanger means connected to the crankcase for receiving gases therefrom and positioned adjacent the mixture passage intermediate the carburetor and intake manifold for passing said gases in heat exchanging relation with the combustible mixture,
   second heat exchanger means connected to said first heat exchanger means for receiving said gases therefrom and positioned adjacent the exhaust system for passing said gases in heat exchanging relation with the hot combustion products, and
   mixing chamber means interposed in the mixture passage and connected to said second heat exchanger means for receiving said gases and mixing the same into the combustible mixture.
2. The combination as claimed in claim 1 further comprising dilution means interposed between said first and second heat exchanger means for mixing a predetermined flow of atmospheric air with said gases.
3. The combination as claimed in claim 2 further comprising valve means operatively associated with said dilution means for controlling the relative flow of ambient air and said gases.
4. The combination as claimed in claim 1 wherein said first heat exchanger means comprises a base plate for mounting the carburetor and having a gas passage therethrough.
5. The combination as claimed in claim 1 wherein said second heat exchanger means comprises a plurality of heating chambers mounted on said exhaust system and connected for series flow of said gases therethrough.
6. The combination as claimed in claim 1 further comprising valve means interposed between said first heat exchanger means and the crankcase for controlling the flow of gases therebetween.
7. In an internal combustion engine including a carburetor and intake manifold together defining a mixture passage for the flow of combustible mixture to the engine, an exhaust system for the flow of hot combustion products from the engine, and a crankcase, the combination therewith of means for reducing the emission of smog causing by-products from the engine comprising:
   a carburetor base plate having a gas passage therethrough connected to the crankcase for receiving gases therefrom and positioned adjacent the mixture passage intermediate the carburetor and intake manifold for passing said gases in heat exchanging relation with the combustible mixture,
   a plurality of heating chambers mounted on the exhaust system and connected to said first heat exchanger means for receiving said gases therefrom for series flow therethrough and for passing said gases in heat exchanging relation with the hot combustion products,
   dilution means interposed between said heating chambers and said base plate gas passage for mixing a flow of atmospheric air with said gases, valve means interposed between said dilution means and said base plate gas passage for controling the flow of gases to said dilution means, and mixing chamber means interposed in the mixture passage and connected to said heating chambers for receiving said gases and mixing the same into the combustible mixture.

References Cited
UNITED STATES PATENTS

| | | | |
|---|---|---|---|
| 1,525,882 | 2/1925 | Padgett | 123—119 |
| 3,151,604 | 10/1964 | Walker et al. | 123—119 |

JULIUS E. WEST, *Primary Examiner*.